Patented Oct. 19, 1948

2,451,841

UNITED STATES PATENT OFFICE 2,451,841

AURO-THIO-GLYCOLIC-ACID-ANILIDE AND METHOD OF MAKING THE SAME

Mozes Juda Lewenstein, New York, N. Y.

No Drawing. Application January 31, 1941,
Serial No. 376,841

2 Claims. (Cl. 260—430)

My invention relates to new and improved gold compounds, which are especially adapted for therapeutic use, and in particular, for treating tuberculosis, arthritis and other diseases in which gold compounds have heretofore been employed.

Another object of the invention is to provide gold compounds for therapeutic purposes which are substantially insoluble in water and in certain body liquids, such as the lipoids and muscular liquids, so that a large injection of the compound can be made at relatively long intervals, of about 2-3 months, whereas the gold compounds which are now used and which are soluble in water and in said body liquids, require bi-weekly or weekly injections.

A compound of the improved type can thus be injected into the body in a regulated dose, thus providing a continuous treatment for a long period, whereas the gold compounds which are now used, are absorbed quickly after each injection.

The improved compounds greatly diminish the danger of side effects. They are much safer, as it is practically impossible to administer an overdose, since the body absorbs the improved compounds only slowly and at a constant rate. The effect of this continuous small dosage is much superior to the effect of intermittent larger doses.

Another object of the invention is to provide an improved method for making such compounds, which are exemplified by auro-thio-glycolic-acid-anilide, whose structural formula is as follows:

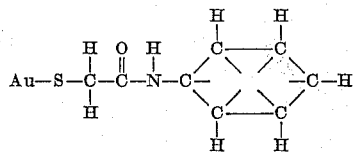

The improved product is made preferably by reacting thio-glycolic-acid-anilide with an aurous bromide (AuBr).

Prior art methods for making the starting material, $HSCH_2CONHC_6H_5$ are disclosed in an article by Beckurts et al. in "Journ. Praktische Chemie," (2) vol. 66, page 174, and in the literature referred to in said article.

Ten grams of the potassium salt of bromo-auric acid ($KBrA_4$) are dissolved in 100 cc. of 96% ethyl alcohol. This salt is also designated as potassium auri-bromide. Sulphur dioxide ($SO_2$) is then led through this solution, through a fine capillary tube, for several minutes. This reaction produces aurous bromide (AuBr). The solution of the aurous bromide is then allowed to stand for 2-3 hours, until it is colorless. A precipitate of KBr is thus formed. This precipitate is separated from the solution of the aurous bromide, which is added to a solution of three grams of the thio-glycolic-acidanilide in 50 cc. of ethyl alcohol. This is done at about 20° C. Then 300 cc. of water are added to said mixture, at 20° C. The water is then removed by decantation or any suitable method, and the mixture is repeatedly thus treated with water, in order to remove all impurities which can thus be removed. The product is then centrifuged twice with 96% ethyl alcohol. It is then centrifuged three times with 100% or absolute ethyl alcohol, and then centrifuged three times with water-free ligroin (petroleum ether), namely, the 40°-60° C. fraction which is distilled from petroleum. After each centrifuging, the product is separated from the liquid which has been used during the centrifuging.

The product is then dried in a high vacuum with the use of phosphorus pentoxide ($P_2O_5$).

Instead of using the above-mentioned salt of bromo-auric acid, I can use any other suitable salt of this acid, and I can use the potassium salt or other suitable salts of chloro-auric acid, or of iodo-auric acid.

I can therefore react the thioglycolic-acidanilide with aurous chloride or aurous iodide.

The resultant product is stable, but reasonable precautions should be taken to preserve it, such as keeping it as much as possible in a high vacuum, since all sulphur-gold compounds deteriorate when exposed to oxygen. This product is used by intramuscular injection. In addition to muscular injection, the improved products can be externally administered in suitable oil suspensions. In treating tuberculosis, the products can be administered intra-fistulary. The type of improved compound which is designated as auro-thio-glycolc-acid-anilide is also designated as aurothioglycoanilide.

Instead of using the salts of bromo-auric acid or chloro-auric acid, I can use other compounds, or the acids themselves, or other compounds of said acids.

I have described a preferred embodiment of the invention and several alternatives in order to avoid limiting the invention to the specific example or examples stated herein. The product is not limited to the product which is made by the process or processes stated herein, and generally speaking, numerous changes and omissions can be made in the disclosure herein, without departing from the spirit of the invention.

The improved gold compounds are slowly absorbed by body liquids other than the lipoids and muscular liquids. When I refer to a gold compound which is substantially insoluble in water and in the body lipoids, I refer to compounds whose solubility is of the order of the solubility of the auro-thio-glycolic-acid-anilide.

I claim:

1. As a new product, auro-thio-glycolic-acid-anilide.

2. A method of making an organic gold compound which is substantially insoluble in water and in lipoids, which consists in contacting dissolved thio-glycolic acid-anilide with a dissolved substance selected from a class which consists of bromo-auric acid, chloro-auric acid, aurous bromide, aurous chloride, and aurous iodide.

MOZES JUDA LEWENSTEIN.

REFERENCES CITED

The following references are of record in the file of this patent:

UNITED STATES PATENTS

| Number | Name | Date |
|---|---|---|
| 1,685,342 | Schoeller et al. | Sept. 25, 1928 |
| 1,869,834 | Yoshioka | Aug. 2, 1932 |
| 2,049,198 | Delange | July 28, 1936 |

FOREIGN PATENTS

| Number | Country | Date |
|---|---|---|
| 348,070 | Germany | Jan. 27, 1922 |
| 157,853 | Great Britain | Apr. 10, 1922 |
| 544,500 | Germany | Feb. 22, 1932 |

OTHER REFERENCES

Beckurts et al.: Journ. Praktische Chemie, (2), vol. 66, pages 174, 177, 185.